United States Patent
Wehner

(10) Patent No.: US 7,614,415 B1
(45) Date of Patent: Nov. 10, 2009

(54) COLLAPSIBLE STRUCTURE WITH INTEGRATED SLEEVE JUNCTION

(75) Inventor: Scott D. Wehner, Mt. Morris, MI (US)

(73) Assignee: Worldwide Creations, LLC, Clio, MI (US)

( * ) Notice: Subject to any disclaimer, the term of this patent is extended or adjusted under 35 U.S.C. 154(b) by 641 days.

(21) Appl. No.: 10/961,716

(22) Filed: Oct. 8, 2004

Related U.S. Application Data

(63) Continuation-in-part of application No. 10/889,675, filed on Jul. 13, 2004.

(60) Provisional application No. 60/496,108, filed on Aug. 19, 2003.

(51) Int. Cl.
*E04H 15/40* (2006.01)
(52) U.S. Cl. ....................................... 135/126
(58) Field of Classification Search ................. 135/143, 135/125, 126
See application file for complete search history.

(56) References Cited

U.S. PATENT DOCUMENTS

| | | |
|---|---|---|
| 3,675,667 A | 7/1972 | Miller |
| 3,960,161 A | 6/1976 | Norman |
| 3,990,463 A | 11/1976 | Norman |
| 4,023,306 A | 5/1977 | Ruggieri, Jr. |
| 4,067,346 A | 1/1978 | Husted |
| 4,815,784 A | 3/1989 | Zheng |
| 4,951,333 A | 8/1990 | Kaiser et al. |
| 5,010,909 A | 4/1991 | Cleveland |
| 5,024,262 A | 6/1991 | Huang |
| 5,038,812 A | 8/1991 | Norman |
| 5,137,044 A | 8/1992 | Brady |
| 5,222,513 A | 6/1993 | Hilliard |
| 5,301,705 A | 4/1994 | Zheng |
| 5,411,046 A | 5/1995 | Wan |
| 5,467,794 A | 11/1995 | Zheng |
| 5,560,385 A | 10/1996 | Zheng |
| 5,579,799 A | 12/1996 | Zheng |
| 5,592,961 A * | 1/1997 | Chin .......................... 135/125 |
| 5,664,596 A | 9/1997 | Zheng |
| 5,778,915 A | 7/1998 | Zheng |
| 5,816,279 A | 10/1998 | Zheng |
| 6,021,794 A | 2/2000 | Guerra |
| 6,098,335 A | 8/2000 | Brown, Jr. |

(Continued)

FOREIGN PATENT DOCUMENTS

FR    1380738 A    12/1964

*Primary Examiner*—David Dunn
*Assistant Examiner*—Noah Chandler Hawk
(74) *Attorney, Agent, or Firm*—Young Basile

(57) ABSTRACT

A portable, collapsible structure having a frame element disposed within a sleeve, defining a perimeter of at least one wall is disclosed. A roof is connected to the at least one wall at a seam, wherein a portion of the sleeve is connected to the seam, and wherein the roof and the at least one wall define an interior of the structure. The portion of the sleeve connected to the seam is disposed within the interior of the structure. The roof and at least one wall may further comprise a flexible material such as nylon, canvas, or polyethylene. Further, the frame element may additionally comprise a continuous band of resilient material. Such a band of resilient material may have sufficient flexibility to be coiled without breaking and sufficient resiliency to substantially return to and maintain its original shape. Steel may be such a suitable resilient material.

13 Claims, 6 Drawing Sheets

U.S. PATENT DOCUMENTS

| | | |
|---|---|---|
| 6,155,281 A | 12/2000 | Zheng |
| 6,209,557 B1 | 4/2001 | Zheng |
| 6,269,826 B1 | 8/2001 | Zheng |
| 6,318,394 B1 * | 11/2001 | Zheng ............... 135/126 |
| 6,325,086 B1 * | 12/2001 | Shinner et al. ............... 135/126 |
| 6,390,111 B2 | 5/2002 | Zheng |
| 6,575,185 B2 | 6/2003 | Zheng |
| 2002/0124878 A1 * | 9/2002 | Zheng ............... 135/126 |
| 2005/0279395 A1 * | 12/2005 | Zheng ............... 135/126 |

* cited by examiner

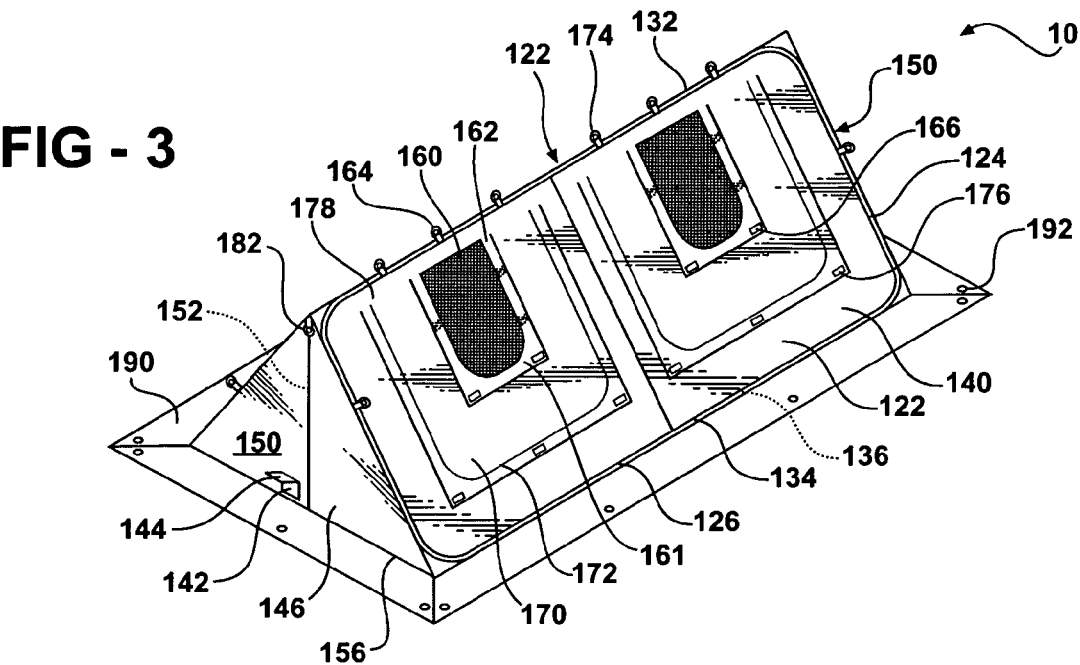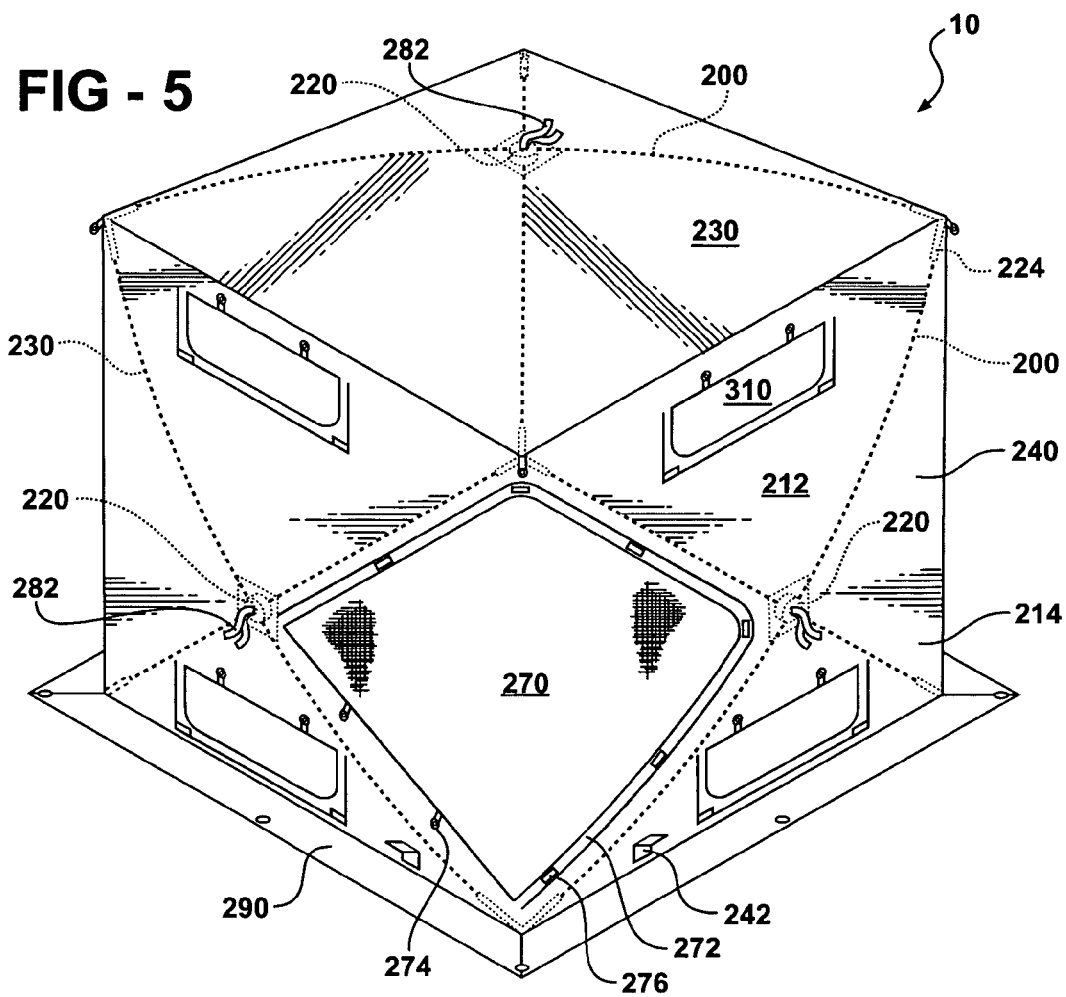

COLLAPSIBLE STRUCTURE WITH INTEGRATED SLEEVE JUNCTION

This is a continuation-in-part application of U.S. patent application Ser. No. 10/889,675, filed Jul. 13, 2004, which claims the benefit of U.S. Provisional Application No. 60/496,108, filed Aug. 19, 2003.

FIELD OF THE INVENTION

The present invention relates to a collapsible, portable structure, and more particularly, to a collapsible, portable structure having an integrated sleeve junction that can be utilized as a greenhouse, hunting blind, or other temporary structure wherein the structure is easily folded into a compact package for ease of transportation and storage.

BACKGROUND OF THE INVENTION

Gardening, both for food production and recreation, is becoming increasingly popular. Greater numbers of gardeners are utilizing small greenhouses to protect plants from inclement weather while still ensuring continued exposure of the growing plants to sunlight. The use of greenhouses for home gardening is well known. Such greenhouses come in a variety of shapes and sizes. Greenhouse window boxes are one popular version of a home greenhouse. These are particularly well-adapted for installation in a double-hung window frame. Unfortunately, these sorts of greenhouses are small and often unsightly in home use applications.

More predominant are elaborate rigid-frame structures that sit on the ground and over which clear membranes are stretched to obtain greenhouse effects. Such devices, even when claiming to be portable, are generally bulky, labor-intensive, and difficult to move. Such devices usually rely upon rigid, as opposed to flexible, frame elements and generally require the use of tools for assembly and disassembly.

At the other end of the spectrum are greenhouse devices that, while portable, are so flimsy as to require frequent repair and replacement. A common instance of this type of device uses U-shaped wire frame elements to straddle one or more plants. A transparent, plastic film is then attached to the wire frame elements. Such structures have difficulty surviving even moderate weather conditions and are easily damaged in one or more of the set-up, take-down, or storage processes.

It would therefore be desirable to have a greenhouse device that is lightweight and portable, yet strong enough to endure the rigors of severe weather and repeated set-up, take-down, and storage cycles.

Further, in the field of collapsible, portable structures, many existing designs contemplate usage conditions spanning relatively brief time periods: overnight, a weekend, or perhaps a week or two at most. This appears to be the product of such devices having developed in recreational fields such as hunting and camping. Thus, while devices in these fields are often suitable for their own purposes, such designs reveal shortcomings when adapted for prolonged periods of use, as in the case of greenhouses, which are often used for weeks or months at a time. Some of these shortfalls include material decay from prolonged exposure to ultraviolet radiation, as well as having edges and seams that may invite the collection of debris in the course of prolonged use.

It is therefore desirable to have a collapsible, portable structure suitable for repeated set-up and take-down cycles yet suitable to endure prolonged seasonal exposure to the sun and other elements without substantial deterioration, decay, or accumulation of debris.

SUMMARY OF THE INVENTION

The present invention is a portable, collapsible structure having a frame element disposed within a sleeve defining a perimeter of at least one wall. A roof is connected to the at least one wall at a seam, wherein a portion of the sleeve is connected to the seam, and wherein the roof and the at least one wall define an interior of the structure. The portion of the sleeve connected to the seam is disposed within the interior of the structure. The roof and at least one wall may further comprise a flexible material such as nylon, canvas, or polyethylene. Further, the frame element may additionally comprise a continuous band of resilient material. Such a band of resilient material may have sufficient flexibility to be coiled without breaking and sufficient resiliency to substantially return to and maintain its original shape. Steel may be such a suitable resilient material.

BRIEF DESCRIPTION OF THE DRAWINGS

FIG. 3 is a perspective view of a third embodiment of the collapsible structure having a triangular cross-section.

FIG. 5 is a perspective view of a fifth embodiment of the collapsible structure having a hub and stringer frame structure.

DESCRIPTION OF THE ILLUSTRATED EMBODIMENTS

Figure 1:
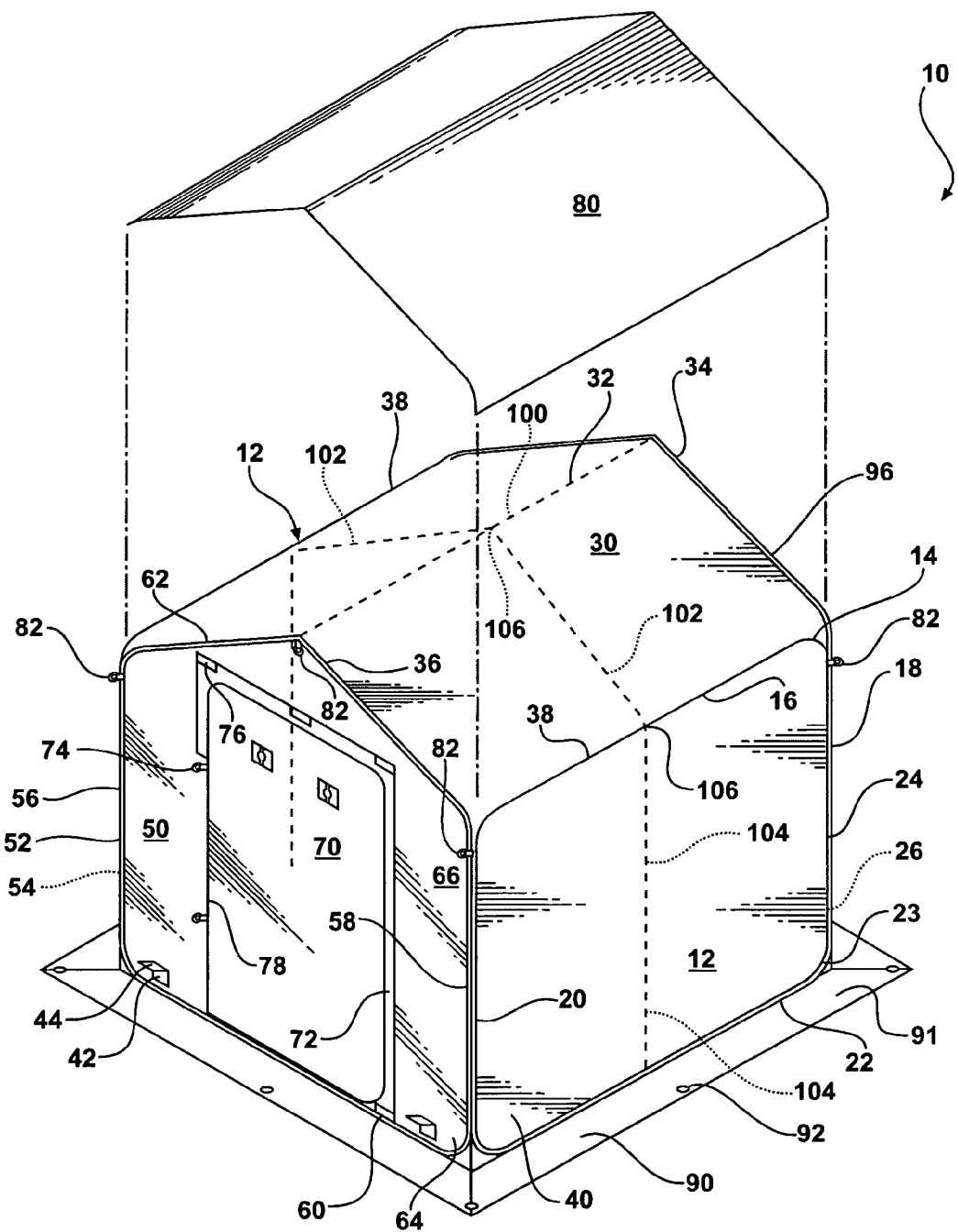
FIG. 1 is a perspective view of a first embodiment of the collapsible structure showing the removability of the roof cover of that embodiment.

FIG. 1 illustrates a collapsible structure or greenhouse 10. The greenhouse 10 is formed from sidewalls 12, end walls 50, and roof 30. Each of the walls 12, 50, and roof 30 consist of a covering material 40 connected to and extending about rigid or semi-rigid frame members 26.

The side walls 12 of the greenhouse 10 are substantially rectangular in shape, although the present invention anticipates that various geometries may be utilized. The side walls 12 each have a top edge 16, back edge 18, front edge 20, and bottom edge 22. These edges, 16, 18, 20, 22, meet at radiused corners 23. The edges 16, 18, 20, 22 and corners 23 constitute a perimeter 14 of each side wall 12. Coincident with the perimeter 14 of side walls 12 is a sleeve 24 containing a resilient frame member 26. The sleeve 24 may be formed as a hem in covering material 40 of the side walls 12 or may be made of other suitable material and attached to the perimeter 14 of the covering material 40 of the side walls 12 by stitching, adhesives, ultrasonic welds, or any other known method of connecting the hem to the covering material 40. The resilient frame members 26 have sufficient flexibility such that a user may coil the frame members 26 over upon themselves. The resilient frame members 26 also have sufficient resiliency and strength to substantially maintain a fully extended shape of perimeter 14 of side panel 12 by tensile forces communicated through sleeve 24 to the covering material 40. The frame members 26 may be fabricated from known materials such as spring steel or fiberglass.

Each end wall 50 of the greenhouse 10 is constructed in similar fashion to the side walls 12. A perimeter sleeve 52 captures a resilient frame member 54 to define a first edge 56, second edge 58, bottom edge 60, top edge 62, and radiused corners 64 of each of the end walls 50. Each perimeter sleeve 52 of each end wall 50 further defines a planform 66 of each end wall 50. These planforms 66 may be angled upward along top edges 62 to create the overall shape of a roof gable. End walls 50 may also be formed in different geometric planforms as may be suitable for particular applications. First and second edges 56, 58 of end walls 50 are attached to the respective back and front edges 18, 20 of side walls 12 by stitching, adhesives, ultrasonic welds, or other known attachments.

The roof 30 of the greenhouse 10 has an apex 32, a roof back edge 34, a roof front edge 36, and roof side edges 38. Covering material 40 or other suitable material meets at top edges 16 of side walls 12 and top edges 62 of end walls 50 to form the roof 30. The covering material is supported by top edges 16 of the side walls 12, top edges 62 of end walls 50, as well as an apex support stringer 100 and roof support stringers 102. Wall support stringers 104 and frame members 26 of side walls 12 support roof support stringers 102. A union 106 is provided at every location where any of stringers 100, 102, or 104 intersect. Unions 106 are generally tubular in cross-section and are made from metal or other rigid material. The tubular cross-section of unions 106 forms sockets to receive ends or portions of intersecting stringers 100, 102, or 104. The ends or other portions of stringers 100, 102, or 104 that do not intersect or join with other stringers may be attached at suitable intervals to interior portions of covering material 40 of the greenhouse 10. Pockets (not shown) formed or sewn in the interior of covering material 40 may be used to slidably receive the ends of stringers 100, 102, and 104 where they are not connected to unions 106. Alternatively, any portion of stringers 100, 102, and 104 or unions 106 may be secured to the interior of the greenhouse 10 with ties (not shown) or the like. The stringers 100, 102, and 104 enhance the overall stability of the greenhouse 10, providing particular support to side walls 12 and roof 30 of the structure. The stringers 100, 102, and 104 may be constructed of any substantially rigid material such as any of various plastics, carbon or fiber composites, metals, or the like. Such materials are sufficiently rigid to provide the requisite support, however, the materials are sufficiently flexible to allow stringers 100, 102, and 104 to withstand the rigors of assembly and disassembly. Stringers 100, 102, and 104 may be of unitary construction or may be made in sections capable of being disassembled.

The edges 34, 36, and 38 of roof 30 are attached to the top edges 16, 62 of the side walls 12 and end walls 50 of the greenhouse 10. These seams may be made by stitching, adhesives, ultrasonic welds, or other means for attaching adjacent pieces of covering material 40. A roof cover 80 may also be employed to cover roof 30 by attaching to greenhouse 10 at ties 82. The roof cover 80 may be an opaque or semi-opaque sheet used to regulate the amount of light passing through the roof 30.

One or more doors 70 may be provided on one or more of the side walls 12 or end walls 50. A closure 72, such as a zipper, hook-and-loop fasteners, or the like, is provided on at least three edges of door 70 to facilitate a secure seal of the door 70 with covering material 40. The fourth edge of the door 70 defines a door hinge edge 78. A plurality of ties 74 may be located adjacent to the door 70 and used to secure the door in a rolled-up condition. The door 70 is constructed of the same covering material 40 as used elsewhere on the greenhouse. Alternatively, the door 70 may be constructed of a different material as needed for a particular application. Temporary fasteners 76, such as small strips of hook-and-loop fasteners, are provided at points along the margin of the covering material 40 surrounding door 70 to facilitate repeated openings and closings of door 70 when repeated use of the closure 72 is inconvenient. The closure 72 provides a more permanent and watertight seal than temporary fasteners 76. In addition, closure 72 may extend partially along a top portion of hinge edge 78 of door 70 in order to facilitate the opening of just the top portion of the door, thus providing optional venting of the greenhouse 10 for temperature or moisture control without fully opening door 70. A screen (not shown) may also be provided on the interior of door 70 to allow ventilation by means of the door 70 while providing protection against insects and vermin.

Watering ports 42 may be provided on one or more of the side walls 12 or end walls 50 of the greenhouse 10. The watering ports 42 are provided with port closures 44. The ports 42 with their associated closures 44 facilitate the introduction of water or electrical conduits, such as hoses and extension cords (not shown), for introducing water and electricity to the interior of the structure while maintaining the overall humidity and temperature integrity of the greenhouse 10.

A skirt 90 may be provided around the bottom edges 22 and 60 of the side walls 12 and end walls 50 of the greenhouse 10. The skirt 90 may include a portion 91 exterior to the side walls 12 and end walls 50 and a portion interior to the side walls 12 and end walls 50 (not shown). The skirt 90 provides both a wind and moisture barrier for preserving the appropriate temperature and humidity conditions within the greenhouse 10. The skirt 90 is attached to the bottom edges 22 and 60 by stitching, adhesives, ultrasonic welds, or other means for attaching the skirt 90 to bottom edges 22 and 60. Skirt openings 92 are provided on the exterior portion 91 of the skirt 90 and may be adapted to accept stakes, ropes, or other devices for securing the skirt 90 to the ground or other supporting surface. Heavy objects such as rocks, gravel, or stone may be applied on top of either the interior portion or the exterior portion 91 of the skirt 90 in order to provide additional securement against breaches in the air or moisture integrity of the greenhouse 10. Alternatively, materials such as wood chips or straw may be used on skirt 90 for more decorative effects. In addition to securing the skirt 90 to a supporting surface, ropes or elastic bands (not shown) may be attached between ties 82 and the ground or other exterior support to provide additional stability to the greenhouse 10.

A zippered perimeter 96 may be provided at or near the perimeter sleeve 24 of one or more of side walls 12 or at or near the perimeter sleeve 52 of one or more of the end walls 50. The zippered perimeter 96 may be used to affix one greenhouse structure 10 to a second greenhouse structure (not shown) having a mating zippered perimeter. In such an arrangement, corresponding doors 70 on the two structures 10 may be aligned and opened to allow a user to travel between the two structures 10 or to provide ventilation between the two structures 10. In such an arrangement, one of the adjacent skirt exterior portions 91 is folded or rolled under its own greenhouse structure 10 in order to accomplish a close mating relationship of the adjacent greenhouse structures.

The method of collapsing the greenhouse 10 will now be described. In order to collapse the greenhouse 10 of the present embodiment, the user first removes any plants or other vegetation (not shown) stored within the greenhouse 10. Next, the user removes any stakes, ropes, or other devices used to secure the greenhouse 10 to its location and removes stringers 100, 102, and 104. Next, the greenhouse 10 is made to lay substantially flat by bringing one set of opposing wall corners into contact with each other. In this configuration, one of side walls 12 will achieve a substantially coplanar relationship with one of the adjacent end walls 50, and the other side wall 12 will similarly achieve a substantially coplanar relationship with other end wall 50. In this condition, the greenhouse 10 will be substantially flat and appear to have two adjacent, flattened panels. Next, these two sets of panels are again folded such that side walls 12 and end walls 50 all lay in substantially the same plane. Throughout this folding process, covering material 40 forming roof 30 and skirt 90 is appropriately arranged to accommodate the panel folding process. Next, the user firmly grabs one corner of the collapsed panels 12 and 50 and begins to roll the collapsed panels. The resilient frame members 26 begin to collapse into an orientation of multiple overlapping coils. The covering material 40 forming the side walls 12, end walls 50, roof 30, and skirt 90 of the greenhouse 10 is again folded and smoothed in order to accommodate the coiled frame members 26 in a substantially compact fashion having an overall diameter approximately one-third of the diameter of the side walls 12 when in their fully opened configuration. Once folded, the greenhouse 10 may be secured by straps (not shown) or placed inside of a container (not shown) for preventing the unwanted uncoiling of the greenhouse structure 10. When collapsed and not in use, greenhouse 10 is stored in a substantially dry location to prevent the formation of mold, mildew, or other contaminants.

Figure 2:
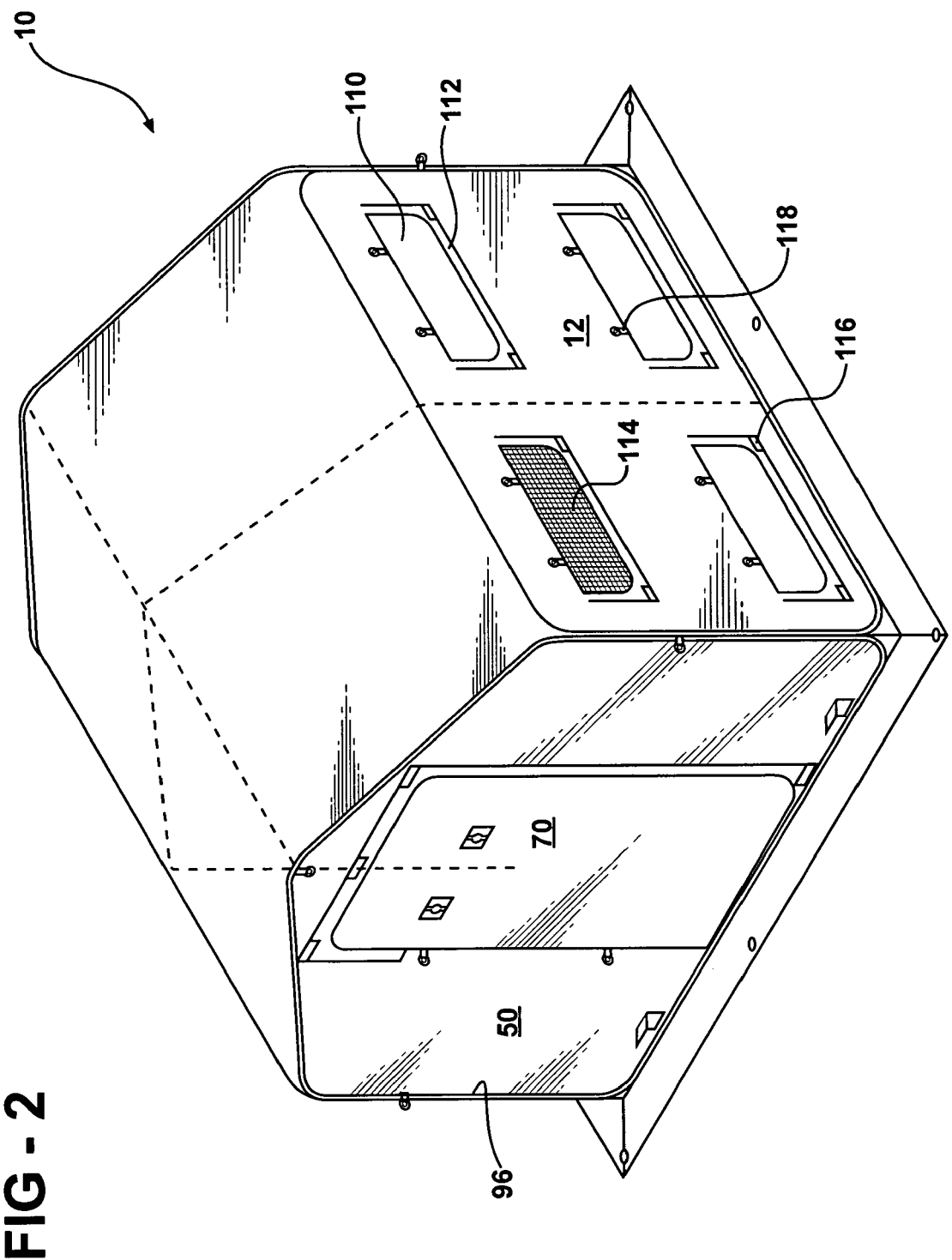
FIG. 2 is a perspective view of a second embodiment of the collapsible structure in which the structure has windows and window flaps.

FIG. 2 shows another embodiment of the greenhouse 10. In this embodiment, one or more windows 110 are provided on one or more of the side walls 12 or end walls 50. Window flaps 112 are used to cover windows 110. The flaps 112 are stitched to covering material 40 along an edge and are otherwise secured to windows 110 by zippers or other closures. As with the above-described door structure 70, small hook-and-loop closures 116 are used to provide temporary or less secure closure of window flaps 112. Additionally, hook-and-loop closures 116 aid in securing corners of window flaps 112 in the event of high winds or severe weather. Ties 118 are used to secure window flaps 112 in a rolled-up or folded-open position. Further, each window is provided with a mesh covering 114 to limit the ingress and egress of insects or vermin.

Turning now to FIG. 3, another embodiment of greenhouse 10 is shown. In this embodiment, the greenhouse features side walls 122 and end walls 150. Side walls 122 are angled with respect to the ground such that they meet at an apex edge 132. Side walls further have bottom edges 126 which rest on the ground or other surface, and side walls 122 are generally circumscribed by side wall perimeters 124. Coincident with side wall perimeters 124 are sleeves 134 that are attached to a covering material 140 by way of stitching, adhesives, ultrasonic welds, or other fasteners. Inside of each sleeve 134 is a resilient frame member 136. The frame member 136 has sufficient flexibility such that it may be folded in a coiled fashion. The frame member 136 also has sufficient resiliency and rigidity to maintain the fully-opened perimeter shape of the wall 122. The resilient frame member 136 maintains this shape through tension exerted through sleeve 134 to urge the sleeve and attached covering material 140 to its most fully expanded position.

The end walls 150 of the greenhouse 10 are substantially triangular in shape and are composed of covering material 140. End walls 150 are attached to adjacent side walls 122 through stitching, adhesives, ultrasonic welds, or other fasteners. End walls 150 have bottom edges 156 that rest upon the ground or other surface. End walls 150 may be further supported by an optional end wall support stringer 152 to aid in maintaining the shape and appropriate rigidity of end walls 150.

Ties 182 are provided at appropriate intervals around the perimeter of end walls 150 and may be used for tying the structure to the ground or other support. Ties 182 may also be used for securing an opaque or partially opaque roof cover material (not shown).

Access ports 170 are provided on one or more of side walls 122 or end walls 150 of the greenhouse 10. Access ports 170 have a hinge margin 178 and are provided with a closure 172, such as a zipper or hook-and-loop fasteners or the like. When the closure 172 is in its open state, the covering material 140 covering the access port 170 may be rolled or folded and secured in a rolled or folded position by ties 174. Temporary closures 176, such as hook-and-loop type fasteners, are provided along the edges of access ports 170 to allow repeated access to the interior of the greenhouse 10 when it is undesirable to repeatedly operate closure means 172. In similar fashion, mesh windows 160 are nested within access ports 170 or may be provided elsewhere on side walls 122 or end walls 150 of the greenhouse 10. Windows 160 are provided with window flaps 161 and have window flap closures 162 to secure window flaps 161 over mesh windows 160 in a sealed state. Window flaps 161 may be made from covering material 140 or may be made from other suitable materials. Window flaps 161 may be rolled or folded and secured in an open position with ties 164. As with access ports 170, window flaps 161 are provided with temporary closures 166 for use when repeated or frequent opening and closing cycles are desired.

One or more watering ports 142 are provided on side walls 122 or end walls 150 of the greenhouse 10. Ports 142 have associated port closures 144 that may be secured in place by zippers, hook-and-loop fasteners, or other devices. Ports 142 are of sufficient size to provide access for water or electrical conduits such as hoses and extension cords (not shown) to introduce these items to the interior of the greenhouse 10.

The embodiment of the greenhouse 10 as shown in FIG. 3, may also be provided with a skirt 190 attached to bottom edges 126 and 156 of the side and end walls 122 and 150 of the greenhouse 10. The skirt 190 extends outward from the greenhouse 10 and may also extend into the interior of the greenhouse 10. In this embodiment, the skirt serves similar functions as in other embodiments. Specifically, the skirt 190 serves as a barrier to both moisture and wind and aiding in preserving the atmospheric integrity of greenhouse 10. Skirt openings 192 are provided for use in staking or tying down the greenhouse 10. Ties 182 may also be used for this purpose. In the event that the greenhouse 10 is not erected in a location suitable for driving stakes or otherwise tying down the greenhouse, weighted objects such as wood, rocks, gravel, cement blocks, or the like may be positioned on skirt 190 to secure the greenhouse 10 to a fixed location.

In order to collapse the greenhouse 10 of the present embodiment, the user first removes any plants or other vegetation stored within the greenhouse 10. Next, the user removes any stakes, ropes, or other devices used to secure the greenhouse 10 to its location. Next, side walls 122 are brought into contact with each other, and the covering material 140 forming end walls 150 and skirt 190 are appropriately folded to accommodate the substantially flat orientation of the greenhouse 10 when side walls 122 are substantially co-planar. Next, the user firmly grabs one corner of the collapsed side walls 122 and begins to roll or coil the collapsed side walls 122 upon themselves. The resilient frame members 136 begin to collapse into an orientation of multiple overlapping coils. The material 140 forming the side walls 122, end walls 150, and skirt 190 is appropriately folded and smoothed in order to accommodate the coiled frame members 136 in a substantially compact fashion having an overall diameter approximately one-third of the diameter of the side walls 122 when in their fully opened configuration. Once folded, the greenhouse 10 may be secured by straps (not shown) or placed inside of a container (not shown) for preventing the unwanted uncoiling of the greenhouse structure 10. When collapsed and not in use, greenhouse 10 is stored in a substantially dry location to prevent the formation of mold, mildew, or other contaminants.

Figure 4:
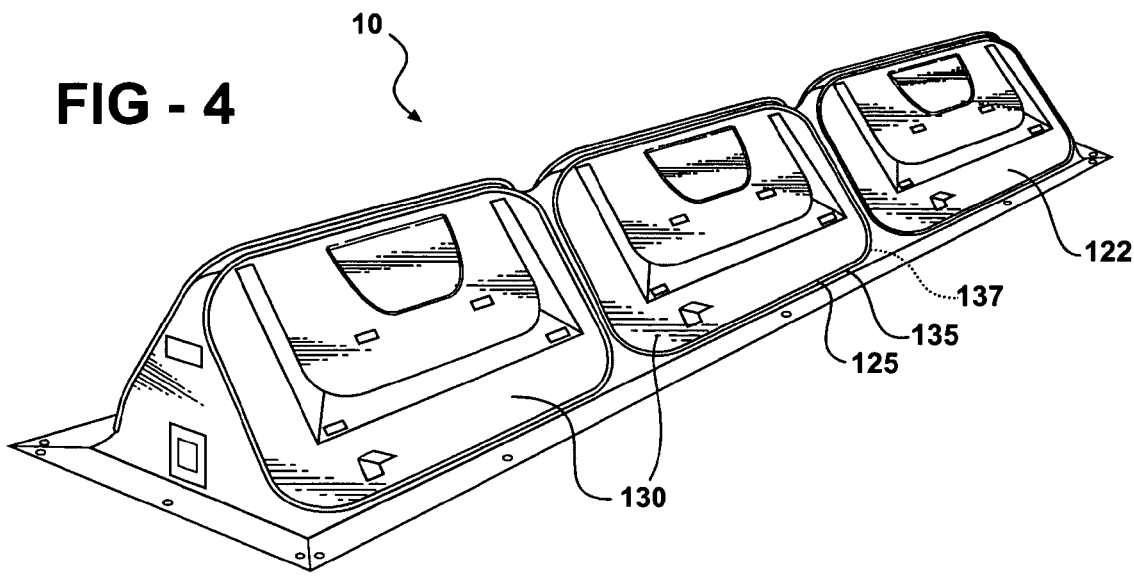
FIG. 4 is a perspective view of a fourth embodiment of the collapsible structure having a triangular cross-section and multiple panel elements.

FIG. 4 shows an alternative arrangement to this embodiment of greenhouse 10 wherein side walls 122 are composed of multiple panels 130. Each panel has a panel perimeter 125 with a coincident sleeve 135 housing a resilient frame member 137. A greenhouse 10 of this configuration is constructed and operates in similar fashion to the embodiment shown in FIG. 3. The use of panels 130 provides additional support to the side walls 122, allowing a greenhouse configuration to span a substantially greater length without sacrificing the substantial rigidity of the side walls 122. A greenhouse 10 of the configuration shown in FIG. 4 is collapsed by again bringing all side panels 130 and associated perimeters 125 into a substantially co-planar relationship and then folding or coiling the frame members 137 to collapse all overlapping panels in a coiled fashion.

Yet another embodiment of the greenhouse 10 can be seen in FIG. 5. In this configuration, the greenhouse 10 has side walls 212 and a roof 230. The primary structural elements consist of hubs 220 and support stringers 200. The hubs 220 are provided in the center of each of side walls 212 and roof 230. Each support stringer 200 connects at one end to hub 220 and extends radially outward from hub 220 to a corner 214 of side wall 212 or roof 230. At the corner 214, each support stringer 200 is attached to covering material 240 by insertion into a corner sleeve 224 that is sewn or otherwise attached to covering material 240. Each support stringer 200 is pivotally affixed to its associated hub 220 by a pin (not shown) that allows the stringer to pivot with respect to the hub 220. Alternatively, each support stringer 200 may be affixed to its associated hub 220 by being inserted or screwed into a socket (not shown) provided in hub 220.

Each side wall 212 and the roof 230 of the greenhouse 10 is dimensioned in such a way that the diagonal length of the covering material 240 of each wall 212 and roof 230 is slightly shorter than the full length of corresponding diagonal support stringers 200 and their associated hub 220. Such dimensioning ensures that each support stringer 200 will maintain a slightly bowed configuration, providing appropriate tension on the covering material 240 on each wall 212 or roof 230 to assure the substantial rigidity of each of those elements when the greenhouse 10 is fully deployed.

As in other embodiments of greenhouse 10, the embodiment illustrated in FIG. 5 similarly includes one or more doors 270 with an appropriate closure device 272, ties 274, and temporary fasteners 276. In addition, one or more windows 310 may be provided with features similar to those disclosed in other embodiments. Additionally, the embodiment of the greenhouse 10 illustrated in FIG. 5 may be further provided with watering ports 242, a skirt 290, and ties 282 all for analogous uses as those described in the embodiments described above.

In the embodiment where support stringers 200 are not pivotally attached to their respective hubs 220, but rather screwed or inserted into sockets provided in hubs 220, assembly and disassembly of greenhouse 10 is achieved through piecemeal assembly of hubs 220, support stringers 200, and covering material 240. Where support stringers 200 are pivotally attached to hubs 220, a more rapid method of assembly and disassembly may be achieved. In this embodiment, in its disassembled state, hubs 220 of greenhouse 10 meet at substantially the same point. This point is placed on the ground or other surface on which the greenhouse 10 is to be erected. Support stringers 200, encapsulated within covering material 240, are spread apart, and the user locates the hub 220 associated with the roof 230. The user grabs the tie 282 located at hub 220 of roof 230 and draws the hub 220 and its associated pivotally-attached stringers 200 away from the ground or support surface until these elements achieve a bowed configuration with respect to the covering material 240 on roof 230. The user next locates hubs 220 associated with each of side walls 212 and similarly draws each hub 220 and support stringer assembly 200 in an outward fashion until each wall 212 achieves a substantially bowed configuration. The user may then appropriately tie down or otherwise secure greenhouse 10 to the surface on which it is erected. In collapsing the greenhouse 10, this process is reversed, where the user simply presses in at each side wall hub 220 and hub 220 of roof 230 until all hubs 220 meet at approximately the same location. The stringers 200, pivotally attached to the hubs, are then gathered into a substantially parallel orientation. The entire collapsed structure may then be stored in a somewhat elongate but relatively narrow diameter bundle. This bundle is then stored in an appropriate receptacle (not shown) or bound with straps (not shown).

Figure 6:
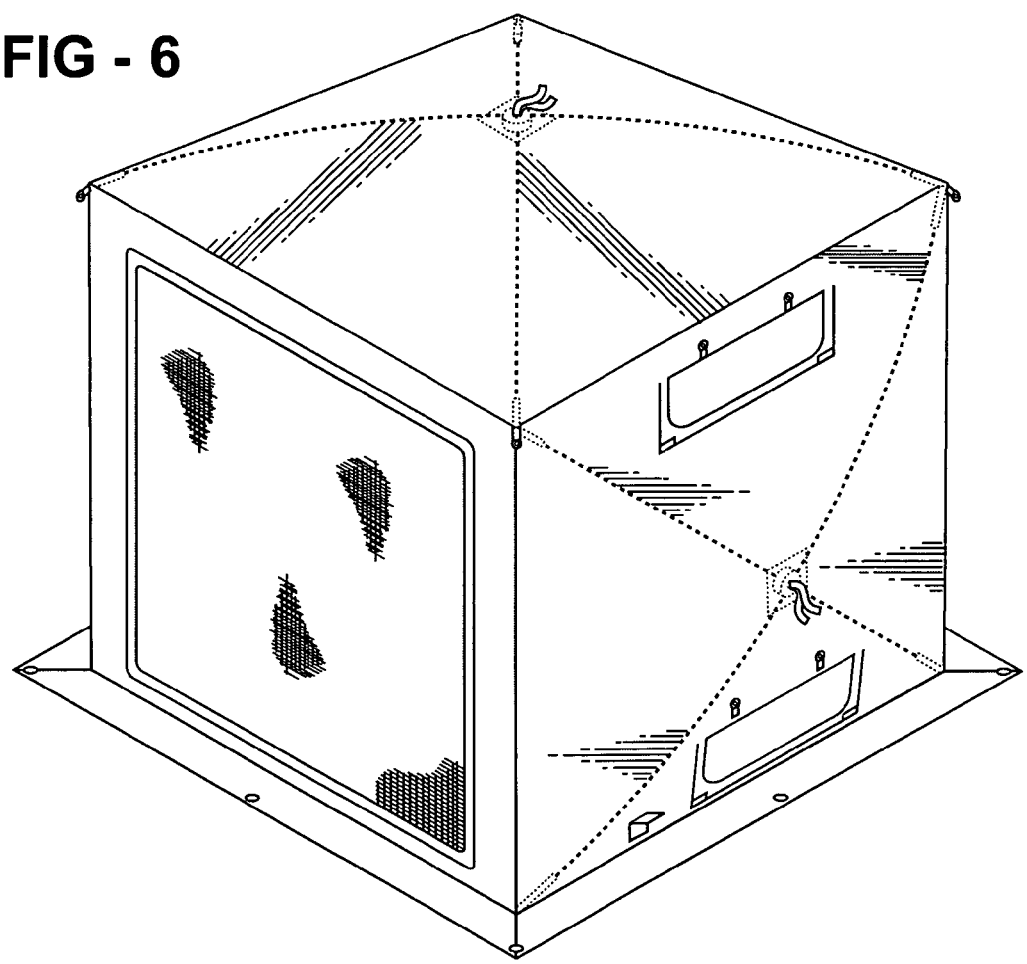
FIG. 6 is a perspective view of a sixth embodiment of the collapsible structure with a hub and stringer frame structure on only three walls and the roof.
Figure 7:
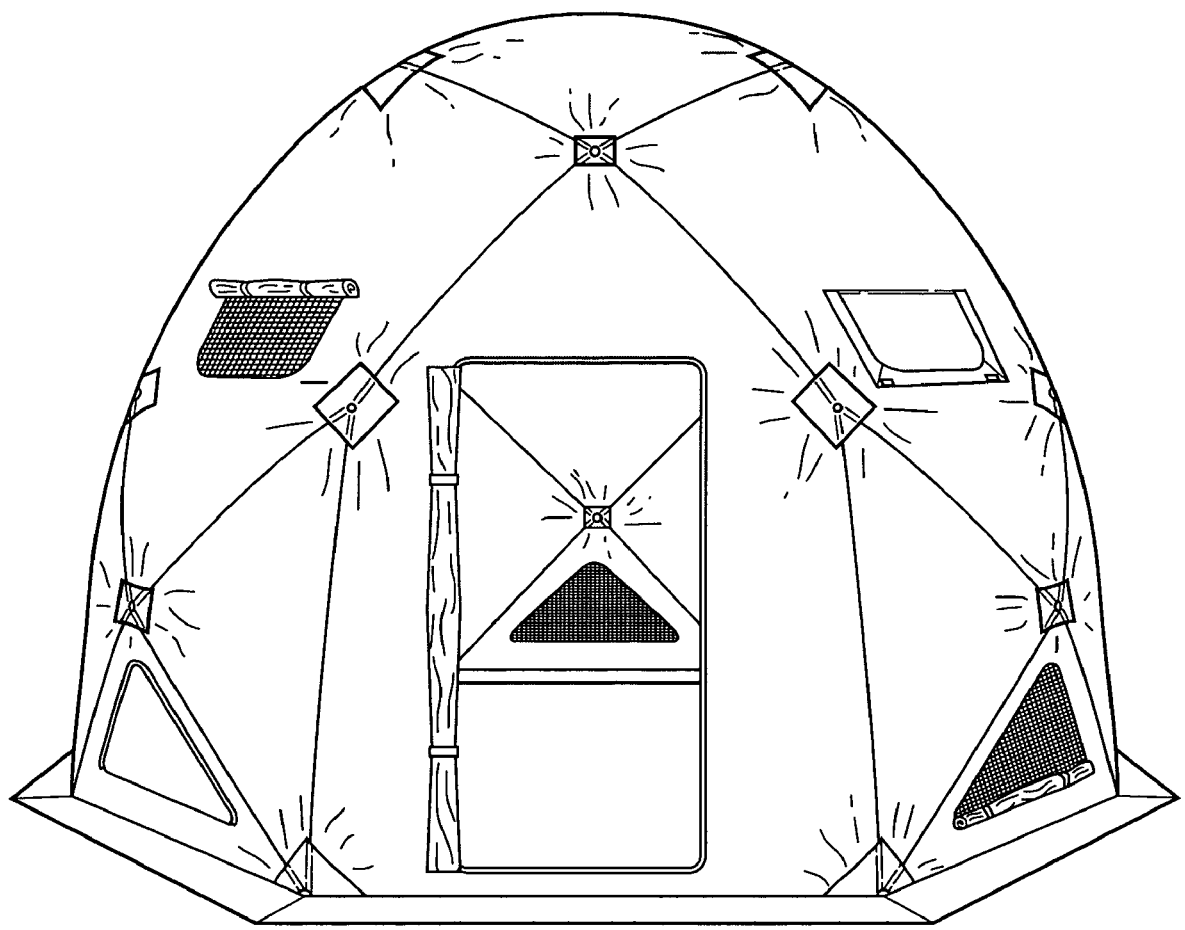
FIG. 7 is a perspective view of a seventh embodiment of the collapsible structure wherein the hub and stringer frame structure establishes a substantially dome-shaped configuration.

Variations on the greenhouse 10 disclosed in FIG. 5 include eliminating hubs 220 and support stringers 200 on one of side walls 212, as depicted in FIG. 6. In addition, a nearly infinite number of configurations may be achieved by varying the number and orientation of both hubs 220 and support stringers 200. For example, roof 230 may be constructed in a hexagonal rather than quadrilateral shape, allowing the addition of two additional wall elements 212 to create a greenhouse 10 having a hexagonal footprint and large interior volume. Alternatively, even larger configurations may be achieved by multiplying the relative geometries, as shown in one example in FIG. 7.

The greenhouse 10 as shown in FIGS. 1 through 7 may be constructed in nearly any size, from a relatively small unit designed to be used as a cloche for covering a single plant, all the way to a greenhouse large enough to accommodate people and tables or rows of plants. Certain of the various features of the greenhouse 10 in the present embodiments may be varied to accommodate the various sizes anticipated. For example, for small structures, windows 110 and their associated features may be superfluous, as might the need for support stringers 100, 102, and 104. Alternatively, larger structures might require the use of a more elaborate network of stringers 100, 102, and 104. It may be desirable as well to adjust the relative size of the door 70 with respect to the wall on which it is placed in order to allow sufficient or desirable access to the interior of the greenhouse 10.

With respect to all embodiments described above, various other modifications may be made for various applications. Specifically, each embodiment may be provided with an integral floor, and any of the above embodiments may be provided with one or more portions constructed from opaque rather than light-transmitting material to achieve particular results, botanical or otherwise. As another alternative, appropriate opaque or semi-opaque covering fabrics may be provided to cover one or more portions of any of the embodiments to offer additional versatility in providing shade or other atmospheric control within the greenhouse 10.

Once erected, each greenhouse 10 may be utilized in the same way as any conventional greenhouse, with windows providing necessary venting for temperature or humidity control. Additionally, each greenhouse 10 has appropriate ports for allowing user access and small ports for providing the introduction of water or other utilities.

Figure 8:
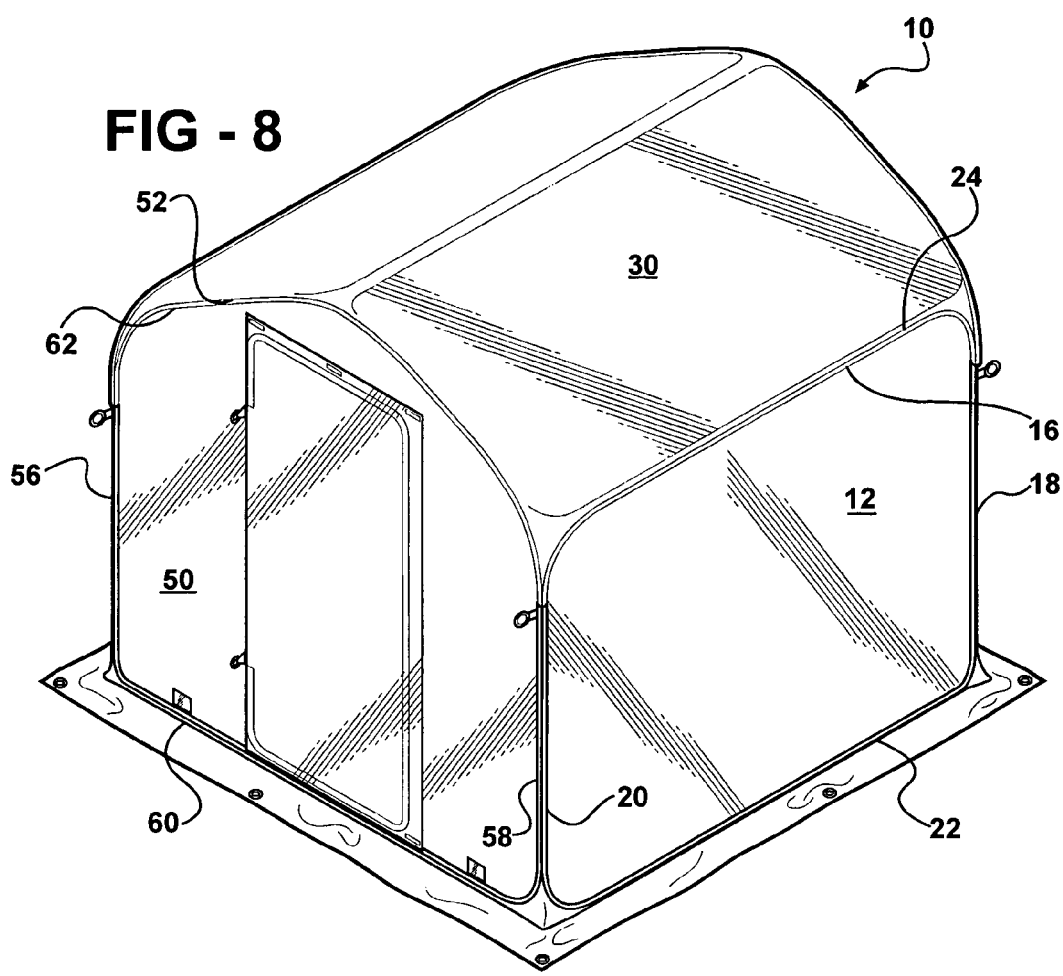
FIG. 8 is a perspective view of an eighth embodiment of the collapsible structure showing an alternative arrangement for joining the roof material to the walls.
Figure 9:
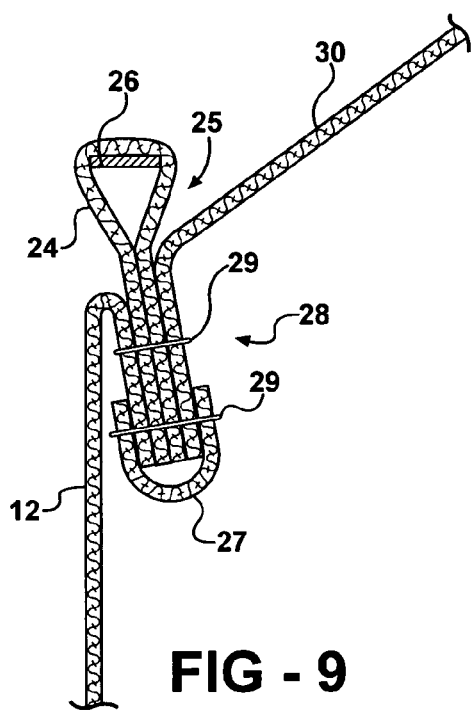
FIG. 9 is an enlarged cross-sectional view of the roof-wall seam of the first embodiment of the collapsible structure showing the details of the construction of the roof-wall seam.

FIG. 8 shows the greenhouse 10 of the present invention in a configuration similar to the embodiment described above in reference to FIG. 1. The embodiment of FIG. 8 differs from the embodiment of FIG. 1 at the points where the roof 30 meets the top edges 16 and 62 of the side walls 12 and end walls 50, respectively. This difference between these two embodiments is best understood in reference to and comparison of FIGS. 9 and 10. FIG. 9 depicts an enlarged cross-sectional view detailing the seam 28 at which a side wall 12 is joined to the side wall perimeter sleeve 24 and the roof 30. As described above, the sleeve 24 captures the resilient frame member 26. The sleeve 24 is attached to the side wall 12 through the use of stitches 29 or other fasteners such as adhesives, ultrasonic welds, or the like. In the embodiment shown in FIG. 1 and detailed in FIG. 9, the roof 30 is also attached to the seam 28 formed by the sleeve 24 joining with the side wall 12, also through the use of stitches 29 or other fastening means. A seam cap 27 is provided over the collected ends of the side wall 12, sleeve 24, and roof 30 and secured with stitches 29 or other adhesives in order to prevent the ends of the material forming the side wall 12, sleeve 24, or roof 30 from prematurely fraying or wearing out. When the greenhouse 10 is in its erected configuration, the tension exerted by the resilient frame member 26 against the sleeve 24 causes a portion of the sleeve 24 to protrude in a substantially vertical orientation above and away from the surface of the roof 30. This results in the formation of a gutter 25 in which leaves, soil, and other debris may collect. Embodiments of the present invention utilizing seams 28 of the configuration disclosed in FIG. 9 may be undesirable for long-term uses. Nevertheless, this configuration of the seam 28 may provide efficiencies in the manufacturing process. It should also be noted that the seam 28 as shown in FIG. 9 may also be utilized for securing the end walls 50 and perimeter sleeves 52 to the roof 30.

Figure 10:
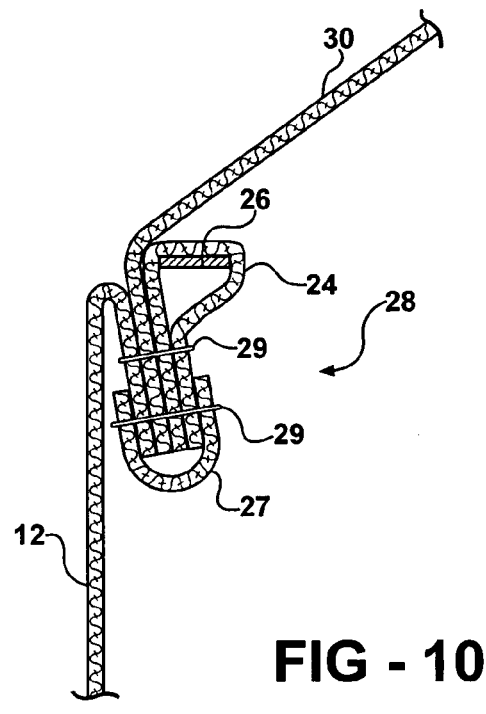
FIG. 10 is an enlarged cross-sectional view of the roof-wall seam of the eighth embodiment of the collapsible structure showing the details of the roof-wall seam of that embodiment.

As an alternative to the roof-wall seam configuration depicted in detail in FIG. 9 and manifested in the embodiment of the greenhouse 10 depicted in FIG. 1, FIG. 10 shows an alternative arrangement of the seam 28 where, as an exemplar, a side wall 12 meets the roof 30. In this arrangement, the sleeve 24 containing the resilient frame member 26 is located on the interior of the surface substantially formed by the side wall 12 and roof 30. Portions of the side wall 12 and roof 30 are then adjacent to each other within the seam 28. This arrangement differs from the seam configuration as depicted in FIG. 9 wherein the sleeve 24 is located between the portions of the side wall 12 and roof 30 involved in the seam 28. As in the seam configuration as depicted in FIG. 9, the seam configuration depicted in FIG. 10 similarly utilizes stitches 29 and seam cap 27 to secure the seam 28. As in the arrangement described above, the seam 28 depicted in FIG. 10 may alternatively utilize adhesives, ultrasonic welds, or the like in place of stitches 29 in order to secure the seam 28. When under tension, the configuration of the seam 28 as depicted in FIG. 10 results in the elimination of the gutter 25 as depicted in FIG. 9, providing an arrangement for the greenhouse 10 better suited for long-term use, as leaves, soil, and other debris are less likely to accumulate along the margins of the roof 30. The seam 28 arrangement of FIG. 10 can be seen as applied to the greenhouse 10 as depicted in FIG. 8, wherein both the side walls 12 and end walls 50 utilize the seam configuration depicted in FIG. 10. As with the seam configuration of FIG. 9, the seam configuration of FIG. 10 may also be utilized with respect to the end walls 50 and end wall perimeter sleeves 52. As can be seen in FIG. 8, the configuration of the roof-wall seam results in a portion of each of sleeves 14 and 52 being disposed within the interior of the greenhouse 10, specifically, where each is covered by the roof 30. A portion of each of sleeves 14 and 52 remains external to the greenhouse 10 along the edges 18, 20, and 22 of the side walls 12 and along the edges 56, 58, and 60 of end walls 50.

The seam configurations as depicted in FIGS. 9 and 10 and embodied in the greenhouses 10 depicted in FIGS. 1 and 8 are not limited in application to greenhouses. Such seam configurations may be applied to other portable, collapsible structures such as hunting blinds, tents, and the like. The particular seam configuration to be used on a portable, collapsible structure may be determined by various considerations such as ease of manufacture, manufacturing costs, and anticipated use for the collapsible structure in question. As such, a variety of materials may be used in forming either of these seam configurations. Specifically, materials such as polyethylene, nylon, canvas, and the like may all be suitable for use as any one of side walls 12, end walls 50, sleeves 24 or 52, roof 30, or seam cap 27.

Although the seam configurations depicted in FIGS. 9 and 10 depict the use of a sleeve 24, similar configurations may be arranged without the use of a sleeve 24 by capturing the resilient frame member 26 within a hem (not shown) substantially formed in a portion of either of the side walls 12 or roof 30. Structures utilizing hems rather than sleeves may be similarly constructed with or without a gutter 25.

While the present invention has been described in connection with what is presently considered to be the most practical embodiments, it should be understood that the invention is not limited to those embodiments. To the contrary, this patent is intended to cover various modifications and equivalent arrangements included within the spirit and scope of the appended claims, which scope is intended to be accorded the broadest interpretation so as to encompass such modifications and equivalent structures as is permitted under the law.

Accordingly, I claim:

1. A portable, collapsible structure, comprising:
a first sheet of flexible material that defines a first wall and a first wall end portion;
a second sheet of flexible material that defines a second wall and a second wall end portion, and the second wall meets the first wall at a corner to define an interior of the structure, and the first wall end portion and the second wall end portion extend into the interior of the structure in direct facing engagement with one another;
a third sheet of flexible material having a first sleeve end portion and a second sleeve end portion that are in direct facing engagement with one another to define a sleeve and capture a frame element therein; and
at least a first stitch that extends through the first wall end portion, the second wall end portion, the first sleeve end portion, and the second sleeve end portion and is disposed entirely within the interior of the structure.

2. The portable, collapsible structure of claim 1, wherein the sleeve defines a perimeter of the first wall and the second wall defines a roof of the structure.

3. A portable, collapsible structure, comprising:
a first wall fabricated from a sheet of flexible material;
a second wall fabricated from a sheet of flexible material, wherein the second wall cooperates with the first wall to define an interior of the structure;
an end portion of the first wall disposed within the interior of the structure to define a first layer of a seam;
an end portion of the second wall disposed within the interior of the structure to define a second layer of the seam, the second layer of the seam in direct facing engagement with the first layer of the seam;
a sleeve that is connected to the seam by a first stitch; and
a frame member disposed within the sleeve, wherein the seam, the sleeve, and the first stitch are disposed entirely within the interior of the structure.

4. The portable, collapsible structure of claim 3, further comprising:
at least a portion of the sleeve is in direct facing engagement with the second layer of the seam.

5. The portable, collapsible structure of claim 3, further comprising:
the end portion of the first wall having a free end;
the end portion of the second wall having a free end;
the sleeve defined by a sheet of flexible material having a pair of free ends; and
the free ends of the end portion of the first wall, the end portion of the second wall, and the sleeve are substantially aligned with one another.

6. A portable, collapsible structure, comprising:
a first wall fabricated from a sheet of flexible material;
a second wall fabricated from a sheet of flexible material, wherein the second wall cooperates with the first wall to define an interior of the structure;
an end portion of the first wall disposed within the interior of the structure to define a first layer of a seam;
an end portion of the second wall disposed within the interior of the structure to define a second layer of the seam, the second layer of the seam in direct facing engagement with the first layer of the seam;
a sleeve having a first end portion that defines a third layer of the seam and a second end portion the defines a fourth layer of the seam, the third layer of the seam in direct facing engagement with the second layer of the seam and the fourth layer of the seam in direct facing engagement with the third layer of the seam;
a first stitch that extends through the first layer of the seam, the second layer of the seam, the third layer of the seam and the fourth layer of the seam; and
a frame member disposed within the sleeve, wherein the seam, the sleeve, and the first stitch are disposed entirely within the interior of the structure.

7. The portable, collapsible structure of claim 6, further comprising:
a seam cap having a first end portion that defines a fifth layer of the seam and a second end portion that defines a sixth layer of the seam, the fifth layer of the seam in engagement with the first layer of the seam and the sixth layer of the seam in engagement with the fourth layer of the seam, wherein the seam cap is disposed within the interior of the structure.

8. The portable, collapsible structure of claim 7, wherein the first stitch extends through the fifth layer of the seam and the sixth layer of the seam.

9. The portable, collapsible structure of claim 7, further comprising:
a second stitch that extends through the first layer of the seam, the second layer of the seam, the third layer of the seam, the fourth layer of the seam, the fifth layer of the seam, and the sixth layer of the seam, wherein the second stitch is disposed entirely within the interior of the structure.

10. The portable, collapsible structure of claim 1, further comprising:
the first sleeve end portion in facing engagement with the second wall end portion.

11. The portable, collapsible structure of claim 1, further comprising:
the frame element biases the sleeve into engagement with an interior surface of the second wall.

12. The portable, collapsible structure of claim 1, further comprising:
the sleeve is disposed entirely within the interior of the structure; and
the seam is disposed entirely within the interior of the structure.

13. A portable, collapsible structure, comprising:
a first wall having an interior surface and an exterior surface;
a second wall that meets the first wall at a corner to define an interior of the structure, the second wall having an interior surface and an exterior surface, wherein the interior surfaces of the first and second walls face the interior of the structure; and
a sleeve connected to at least one of the first wall or the second wall at the corner, the sleeve having a frame element captured therein an outer surface of the sleeve is biased by the frame element into engagement with at least one of the interior surface of the first wall or the interior surface of the second wall to support the structure, and further wherein the sleeve is disposed entirely within the structure.

* * * * *